(No Model.)

M. L. DEERING.
PROCESS OF REPAIRING OR FORMING FIBROUS PULP BARRELS OF FRACTIONAL PARTS OF BARRELS.

No. 302,193. Patented July 15, 1884.

WITNESSES

INVENTOR

UNITED STATES PATENT OFFICE.

MARK L. DEERING, OF CLEVELAND, OHIO, ASSIGNOR TO THE DEERING SEAMLESS BARREL COMPANY, OF SAME PLACE.

PROCESS OF REPAIRING OR FORMING FIBROUS-PULP BARRELS OF FRACTIONAL PARTS OF BARRELS.

SPECIFICATION forming part of Letters Patent No. 302,193, dated July 15, 1884.

Application filed April 23, 1884. (No model.)

*To all whom it may concern:*

Be it known that I, MARK L. DEERING, of Cleveland, in the county of Cuyahoga and State of Ohio, have invented certain new and useful Improvements in a Process of Repairing or Forming Fibrous-Pulp Barrels of Fragments or Fractional Parts of Barrels; and I do hereby declare the following to be a full, clear, and exact description of the invention, such as will enable others skilled in the art to which it pertains to make and use the same.

My invention relates to a process of repairing or forming fibrous-pulp barrels of fractional parts of barrels; and it consists of the steps hereinafter described, and pointed out in the claims.

In the process of making seamless barrels of fibrous pulp, as described in my application No. 124,214, barrels are sometimes defective, or are injured in some of the parts while the remainder of the barrel is in good condition. The same occurs with barrels that are in use, holes being broken by accident or rough usage. I have therefore invented a process of repairing these barrels by cutting out the injured or defective part, and renewing it with parts of another barrel, also fitting together the fractional sound parts of different barrels to make an entire barrel.

Figure 1:
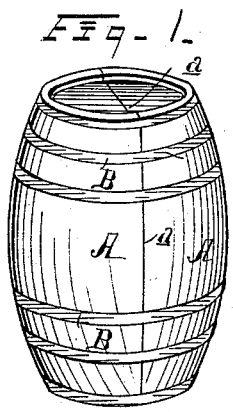
Figure 2:
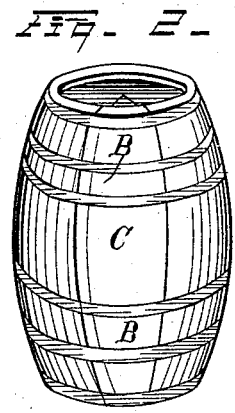
Figure 3:
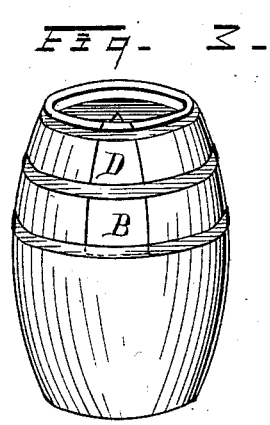
Figure 4:
Figure 5:
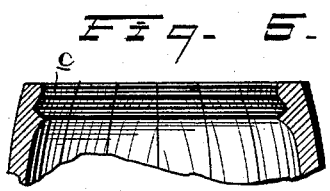

In the accompanying drawings, Figure 1 is a view in perspective of a barrel that has been made from two half-barrels. Fig. 2 is a view in perspective of a barrel when a section has been inserted to complete the barrel. Fig. 3 is a view in perspective of a barrel when a small piece has been inserted. Fig. 4 is a view in perspective of a barrel with the upper head wanting, and shows slits in the barrel made preparatory to inserting a head. Fig. 5 is a vertical section of the upper end of the barrel, showing the crozing for receiving the head.

The imperfect or injured barrels are cut, preferably with a saw, so as to save as much of the sound part of the barrel as practicable. Those that will make a half-barrel, A, are severed accordingly, and two parts are placed together, as shown in Fig. 1. The edges *a* are glued or cemented together, forming a complete barrel, and a sufficient number of hoops, B, are placed thereon to hold it firmly together. Other barrels only require a section to be cut out, as shown in Fig. 2, and a corresponding section, C, added, the edges being glued or cemented and the hoops added as before. A small piece, D, may be set in, as shown in Fig. 3. Sometimes a head is broken or is imperfect. In such case a crozing is cut, as shown in Fig. 5, to receive the head, and the end of the barrel is slitted, as shown at *d* in Fig. 4. The slitted part may then be spread sufficiently to insert the head into the crozing, and one or more hoops, as required, are placed in position. When heads are inserted in this manner, it is difficult to fill the slits with glue or cement, so that the barrel will hold liquid. For other purposes the barrels will do good service and have this advantage—that the heads may at any time be removed and again replaced in position. The barrels that are to contain liquid may be coated inside, in the usual manner, with glue, cement, or any of the preparations used for the purpose, according to the kind of liquid to be stored. The barrels are preferably severed longitudinally and radially. When a barrel is made up of halves, thirds, or of such divisions that the head may be inserted without slitting the parts, as aforesaid, the heads may be glued in and the barrel made to contain liquids. When the heads are perfect, they may be left intact and the inserted part set in like a stave.

What I claim is—

1. The process herein described of repairing or forming fibrous-pulp barrels of fractional parts of barrels, consisting, essentially, first, in putting together fractional parts of two or more barrels; second, in securing the parts with hoops, substantially as set forth.

2. The process herein described of repairing or forming fibrous-pulp barrels of the fractional parts of barrels, consisting, essentially, in the following steps: first, fitting together fractional parts of two or more barrels to form one barrel; second, gluing or cementing the parts together; third, securing the parts with hoops, substantially as set forth.

3. The process herein described of repairing seamless pulp barrels by supplying one or more heads, and consisting, essentially, in the following steps, to wit: first, cutting a crozing in the barrel to engage the head; second, slitting the end of the barrel longitudinally and, preferably, radially; third, inserting the head by spreading the slitted parts; fourth, securing the parts by hoops, substantially as set forth.

In testimony whereof I sign this specification, in the presence of two witnesses, this 16th day of April, 1884.

MARK L. DEERING.

Witnesses:
ALBERT E. LYNCH,
CHAS. H. DORER.